Figure 1:
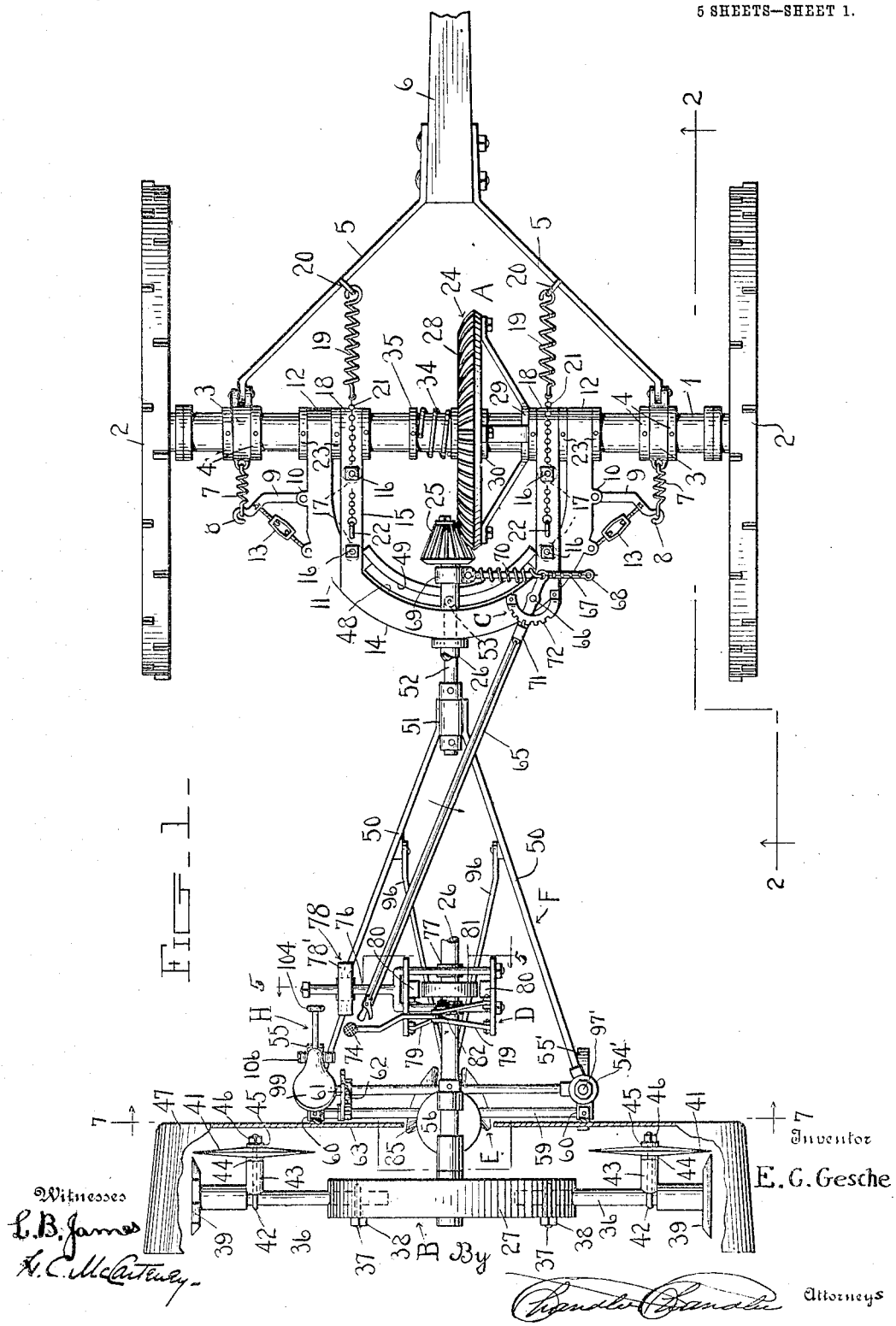

E. C. GESCHE.
COTTON CHOPPER.
APPLICATION FILED APR. 6, 1908.

925,768.

Patented June 22, 1909.
5 SHEETS—SHEET 2.

Witnesses
L. B. James
H. C. McCartney

Inventor
E. C. Gesche

E. C. GESCHE.
COTTON CHOPPER.
APPLICATION FILED APR. 6, 1908.

925,768.

Patented June 22, 1909.
5 SHEETS—SHEET 3.

Witnesses
L. B. James
F. C. McCurtury

Inventor
E. G. Gesche
By Chandler & Chandler
Attorneys

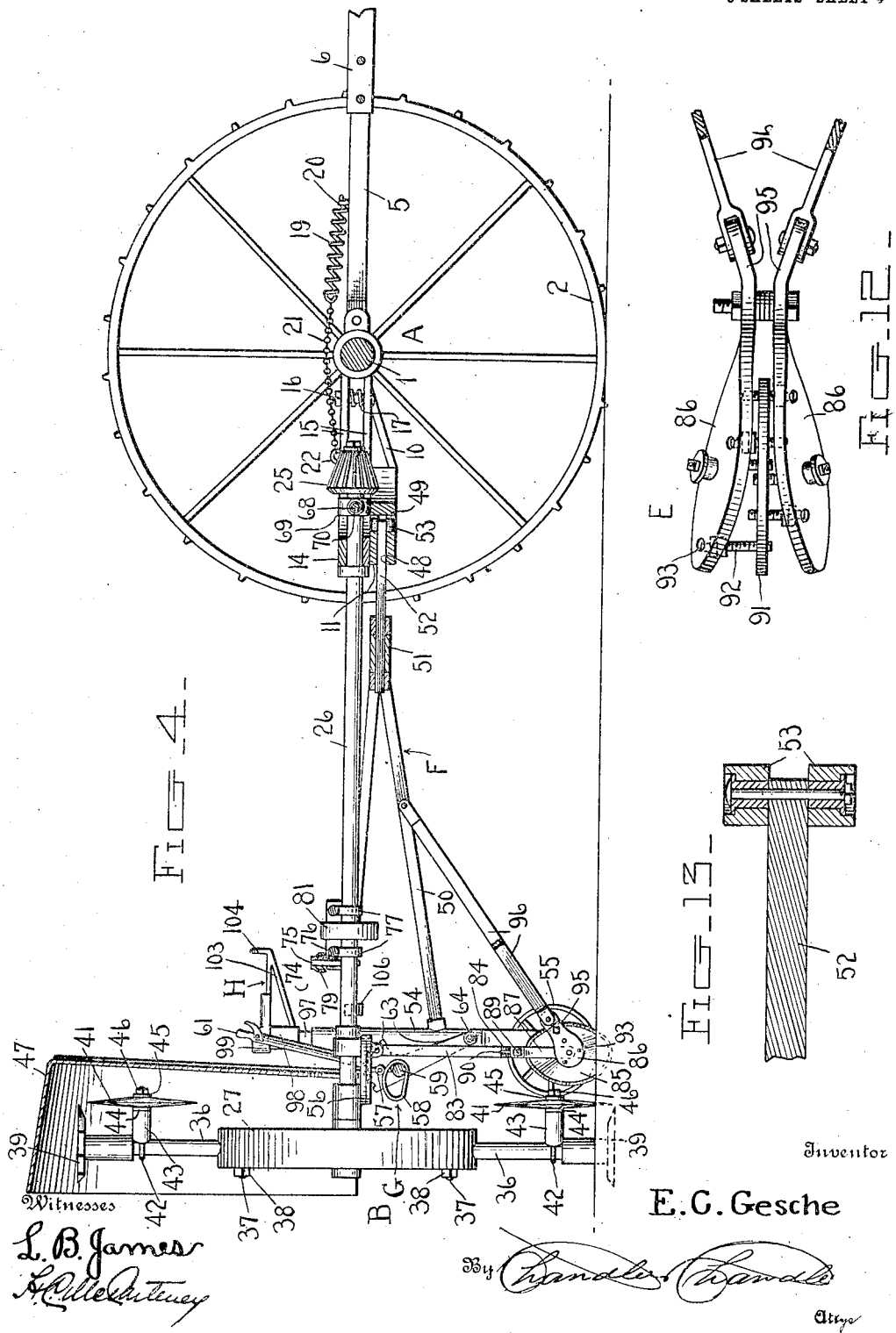

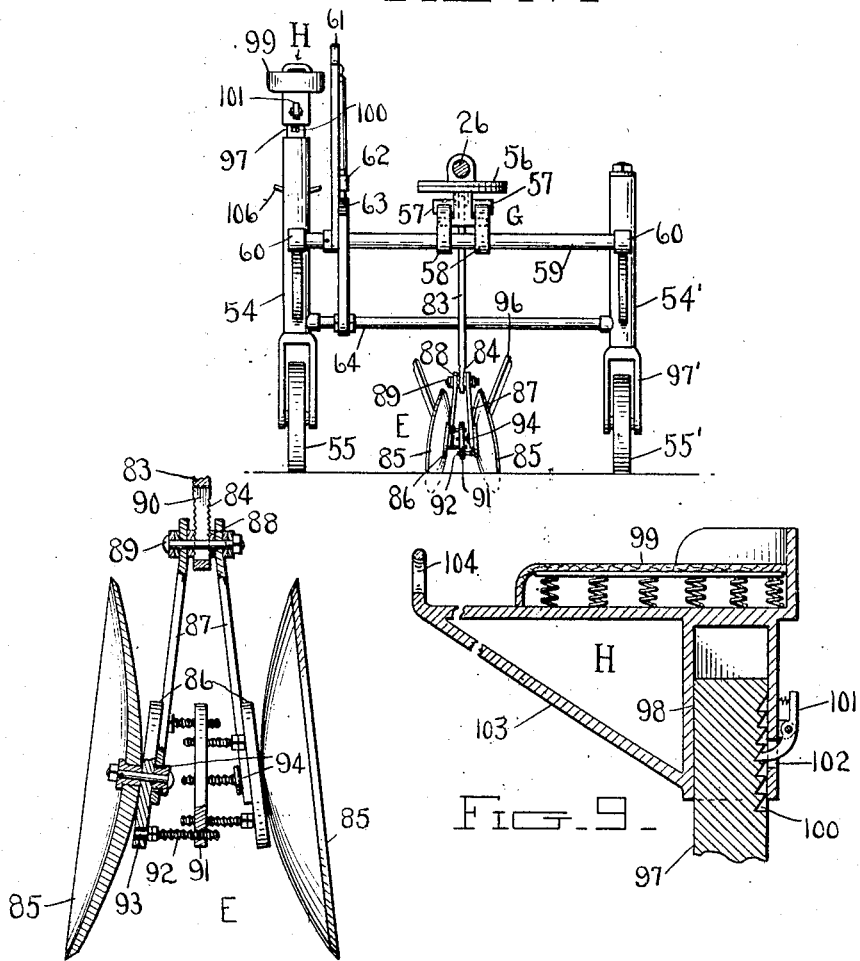

UNITED STATES PATENT OFFICE.

EUGENE C. GESCHE, OF SEGUIN, TEXAS.

COTTON-CHOPPER.

No. 925,768.   Specification of Letters Patent.   Patented June 22, 1909.

Application filed April 6, 1908. Serial No. 425,494.

*To all whom it may concern:*

Be it known that I, EUGENE C. GESCHE, a citizen of the United States, residing at Seguin, in the county of Guadalupe, State of Texas, have invented certain new and useful Improvements in Cotton-Choppers; and I do hereby declare the following to be a full, clear, and exact description of the invention, such as will enable others skilled in the art to which it appertains to make and use the same.

The present invention has reference to improvements in cotton choppers, and it aims generally, to provide an exceedingly simple and comparatively inexpensive machine of that nature for effectively thinning and chopping a row of cotton plants during its passage across a field, and for loosening the earth around the plants prior to the thinning and chopping operations.

The invention resides more especially in the particular driving mechanism employed for effecting the rotation of the fly-wheel to which the thinning and chopping implements are secured; in the particular devices made use of for throwing the driving mechanism into and out of operation; in the provision of a separate brake mechanism for instantly terminating the rotation of the fly-wheel when the driving mechanism is thrown out of operation; and in the particular construction of the brake mechanism.

The invention further resides in the provision of means for raising and lowering the drive shaft, which carries the fly-wheel and the chopping implements, to adjust the position of said implements with reference to the surface of the ground.

The invention still further resides in the particular devices employed for steering the machine and for relieving the strain upon the main axle during the travel of the machine.

Finally, the invention resides in the provision of means for raising and lowering the disks for loosening the earth around the plants.

Figure 2:
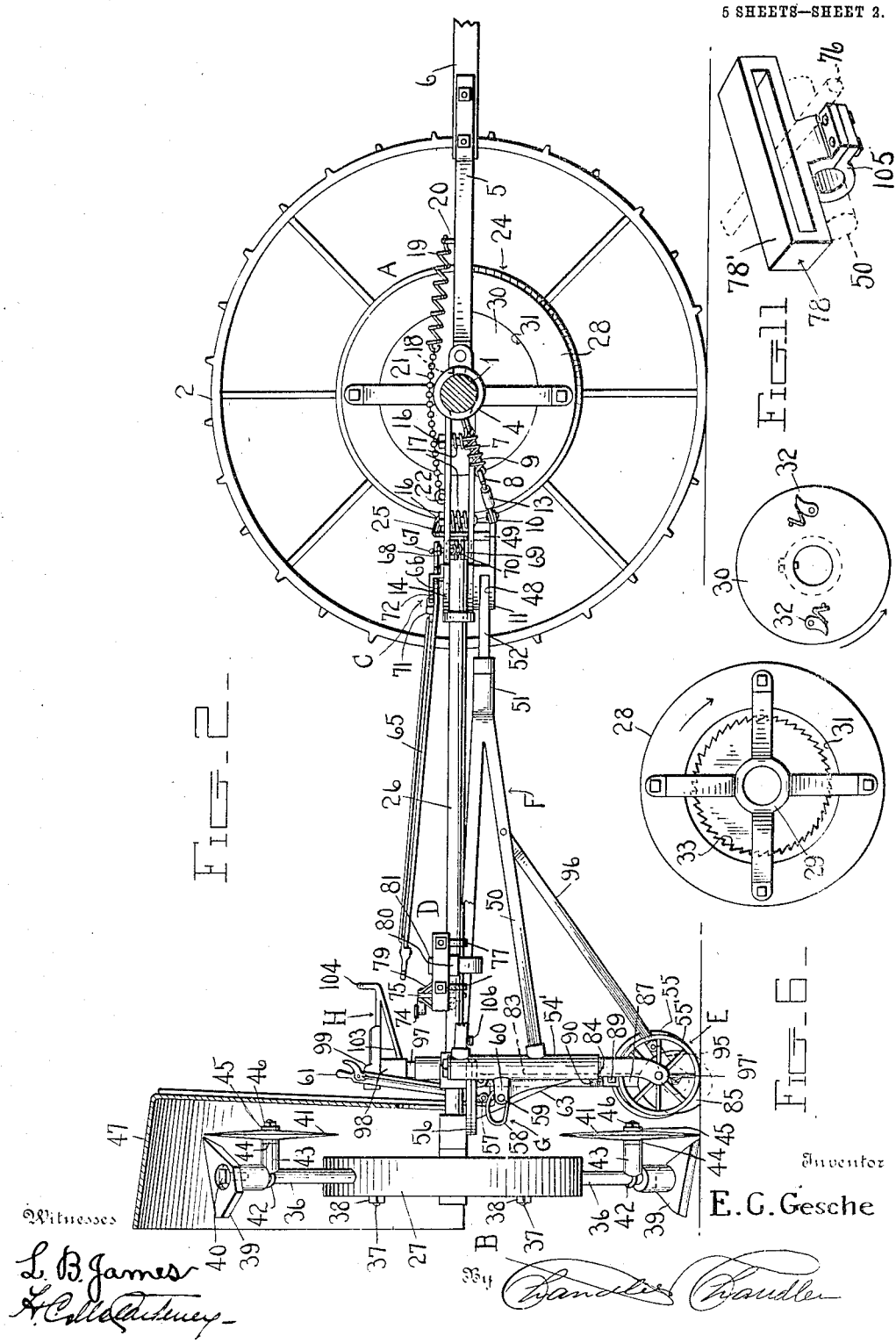
Figure 3:
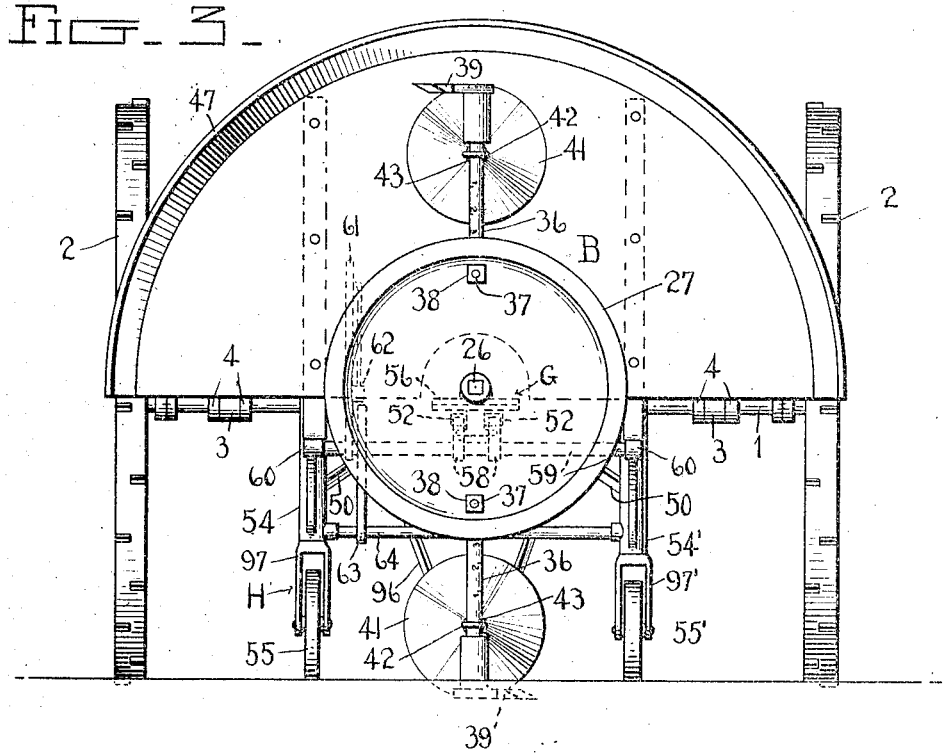
Figure 5:
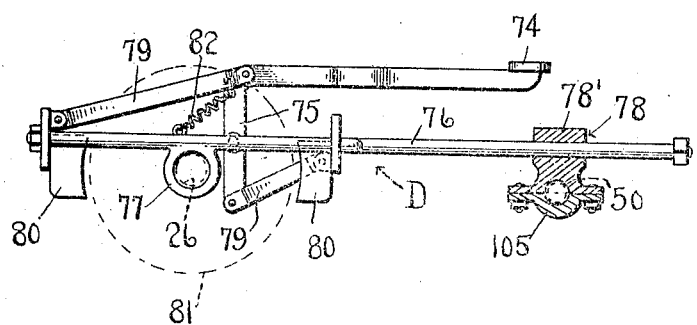

The preferred embodiment of the invention is illustrated in the accompanying drawings, in which corresponding parts or features, as the case may be, are designated by the same reference characters throughout the several views, wherein:

Figure 1 is a plan view of the complete invention. Fig. 2 is a longitudinal section taken on the line 2—2 of Fig. 1. Fig. 3 is a rear elevation. Fig. 4 is a longitudinal section taken centrally through Fig. 1. Fig. 5 is an enlarged detail sectional view of the brake mechanism, taken on the line 5—5 of Fig. 1. Fig. 6 is a collective view of the members of the main drive gear, said members being shown in rear elevation. Fig. 7 is a transverse section taken on the line 7—7 of Fig. 1. Fig. 8 is an enlarged fragmental detail view, partly in section, of the disks and their attendant parts. Fig. 9 is an enlarged sectional view of the vertically movable steering seat, showing also the devices for retaining the same in adjusted position. Fig. 10 is an enlarged fragmental side elevation of one end of the lower yoke. Fig. 11 is an enlarged perspective view of the bracket with which one of the rear diagonal braces and the supporting member of the brake mechanism are engaged. Fig. 12 is an enlarged plan view of the plates to which the disks are attached. Fig. 13 is an enlarged detail view, partly in section of the forward end of the front brace, showing the rollers carried thereby.

In the accompanying drawings, A designates generally, the driving mechanism; B the chopping and thinning mechanism; C the devices for throwing the driving mechanism into and out of operation; D the brake mechanism; E the vertically movable disks and the devices for operating the same; F the supporting braces or frame work of the machine; G the mechanism for raising and lowering the drive shaft and the rear portion of the frame; and H the steering mechanism.

Referring more particularly to the drawings, 1 designates the front axle provided at its opposite ends with the spurred ground wheels 2 adjacent each of which is located a loose collar 3 having a washer 4 disposed at each side thereof, the washers being fast upon the axle. The front portion of each collar is connected by means of a brace 5 with the pole 6 of the machine, while the rear portion thereof is connected by a retractile coil spring 7 with the offset hooked end 8 of a rod 9 pivoted at its inner end to the adjacent arm 10 of a double yoke 11, the free ends of the arms of said yoke terminating in collars 12 which loosely embrace the axle. The tension of the coil springs is regulated by means of turn-buckles 13 connected with the rods 9 and with the adjacent arms of the yoke. Upon the yoke 11 is mounted a second yoke 14 whose arms 15 likewise extend forwardly, said yoke consisting of a pair of spaced members as shown in Fig. 4 which are yieldingly connected together adjacent the free ends of their arms by means of bolts 16, each bolt having fitted thereon an expansible coil spring 17 interposed between the corresponding arm members (see Fig. 10). The arms of said yoke members terminate in curved jaws 18 which fit against the opposite sides of the axle. The arms of the upper yoke 14 are likewise connected with the braces 5 by means of retractile coil springs 19 each of which has one end secured to a hook 20 carried by the adjacent brace and the other end thereof secured to the front end of a chain 21 whose rear end is fastened to an eye bolt 22 set into the yoke arm. The two yokes are held against movement longitudinally of the axle by means of washers 23.

Owing to the yielding connection between the yokes, the axle, and the braces, and between the latter, the collars 3, and the yokes, it will be apparent that during the passage of the machine across a field, the strain upon the axle will be relieved to a material extent, since the forward pull will be offset or neutralized by the several springs as will be understood.

The driving mechanism A by means of which the rotation of the chopping and thinning mechanism B, hereinafter described, is effected, comprises a main drive gear 24 mounted upon the axle between the arms 15 of the upper yoke, and a beveled pinion 25 secured to the forward end of the drive shaft 26 whose rear end is secured to the hub of the fly-wheel 27 which carries the chopping and thinning implements. The gear 24 as shown in Fig. 6, comprises an annular outer member 28 which is loosely mounted upon the axle and has secured to its rear face the arms of a spider 29, whose hub portion is likewise loose upon the axle, and an inner member 30 which is rigidly connected to the axle and normally fits in an annular seat 31 formed in the rear face of said outer member. The inner member 30 is provided at diametrically opposite points with a pair of spring-pressed pawls 32 which engage an annular series of ratchet teeth 33 with which the loosely-mounted outer member is provided, said outer member being yieldingly forced toward the stationary inner member by means of a coil spring 34 which embraces the axle and is interposed between said outer gear member and a stationary collar 35 carried by the axle. The provision of the last-mentioned coil spring will therefore effect the normal disposition of the inner gear member in the seat 31, and the resultant engagement of the pawls 32 with the ratchet teeth 33, in consequence of which, the rotation of the axle will effect the rotation of the drive shaft 26 and of the fly-wheel 27, as will be understood.

The fly-wheel has formed in its periphery at diametrically opposite points a pair of inwardly extending recesses in each of which is fitted a rod 36 whose inner end extends through the eye portion of a bolt 37 which is likewise carried by the fly-wheel and is fitted in an inwardly-extending opening formed in the rear face of said wheel, said openings and recesses communicating with each other. The outwardly-projecting stem of each bolt has threaded thereon a tightening nut 38, owing to the provision of which it will be apparent that the rods 36 may be retained in adjusted position with reference to the fly-wheel without necessitating the formation of a series of openings in and a consequent weakening of said rods. The outer end of each rod 36 is fitted in the sleeve portion of a hoe 39, the blade of which is provided with an inclined cutting edge, as shown in Fig. 2. The hoes are retained in place upon the rods by means of threaded bolts 40. Each rod 36 is further provided with a cutting disk 41 revolubly mounted upon the stem of an eye-bolt 42, whose eye-portion embraces the rod, there being interposed between such portion and the hub of the disk a sleeve 43 and a washer 44 which are likewise fitted upon the bolt stem, the projecting outer end of which latter carries a similar washer 45 and a tightening nut 46, the provision of said nuts permitting the bolts to be retained in adjusted position upon the rods 36, as will be understood. It will likewise be apparent that the cutting disk may be adjusted toward and from the adjacent hoe by removing the disk and both washers from the bolt, and subsequently re-attaching said parts to the bolt in altered position, i. e., with the disk in direct contact with the sleeve 43, or with both washers between the latter and the disk. The drive shaft carries at its rear end, a flanged semi-circular casing 47 which covers the upper half of the fly-wheel, and the rod and chopping implements secured thereto.

As above stated, the upper yoke 14 is pivotally connected to the axle, and comprises upper and lower horizontal members arranged in spaced relation to each other. Through the space between said yoke members the front end of the drive shaft extends. The lower yoke 11 is likewise pivoted to the axle and its bight portion has formed therein a horizontal longitudinal slot 48 and a vertical longitudinal slot 49 which communicate with each other throughout their entire length. The yoke in question forms the front section of the frame of the machine, and has connected therewith the rear frame section, which latter includes a pair of diverging downwardly-inclined braces 50 each comprising upper and lower branches, as shown in Figs. 2 and 4. The meeting front ends of these braces are secured to a sleeve 51, in which a square rod 52 is fitted and made fast, the forward portion of said rod extending through the horizontal slot 48 above referred to, and having attached to its free end, upper and lower rollers 53 which fit in the vertical slot 49, both rollers being fastened to said rod end by a single bolt, as shown in Fig. 13. The rear ends of the braces 50 are secured to vertically-disposed sleeves 54 and 54' in which are fitted rotatable posts 97 and 97' whose bifurcated lower ends carry ground wheels 55 and 55', the left hand ground wheel 55 having a greater diameter than that of the right hand ground wheel 55' and forming one element of the steering mechanism, as hereinafter described.

The mechanism G for raising and lowering the rear end of the drive shaft, to adjust the position of the chopping implements with respect to the ground, includes a fifth-wheel 56 secured to said shaft adjacent the casing 47, the lower member of said fifth wheel carrying a pair of grooved rollers 57, and a pair of cam-shaped tracks 58 rigidly secured to a rock shaft 59 disposed transversely of the machine and having its opposite ends fitted in openings formed in brackets 60 carried by the sleeves 54, the rollers 57 riding upon the cam tracks, as shown in Figs. 4 and 7. The shaft 59 is rocked by means of a lever 61 secured at its lower end thereto, said lever being provided with a spring pressed dog 62, adapted for engagement with a rack 63 secured to a horizontal rod 64 which connects said sleeves adjacent the lower ends thereof. It will be apparent, therefore, that the movement of the lever in one direction or the other will impart a corresponding rocking movement to the shaft 59, whereupon the engagement of the cam tracks carried thereby with the rollers 57 will effect a swinging movement of the drive shaft in a vertical plane, thus adjusting the position of the chopping implements with reference to the ground.

The mechanism C for throwing the driving mechanism into and out of operation, comprises a lever 65 which is pivoted adjacent its front end to an upright pin 66 set into the top member of the upper yoke 14, the extreme front end of said lever having secured thereto, the adjacent end of a chain 67, whose other end is fastened to the outer end of a rod 68 movable endwise across the outer face of the outer arm 15 of said yoke, and disposed transversely with respect thereto, the inner end of said rod being pivoted to an ear formed upon a collar 69 secured to the drive shaft adjacent the gear 25, which latter is held normally engaged with the gear 24 by a retractile coil spring 70 which embraces the rod 68 and is secured at one end to the collar ear above referred to and at the other end to the lever, as shown in Fig. 1. The lever is locked in adjusted position by means of a spring-pressed dog 71 arranged for engagement with a rack 72 which is likewise carried by the upper member of the yoke 14. The lever extends rearwardly to a point within easy reach of the occupant of a seat 99 carried by the left-hand sleeve 54 as hereinafter described. When, therefore, the handle end of the lever is moved to the right, or in the direction of the arrow shown in Fig. 1, the front end of said lever will therefore move in the opposite direction, effecting an endwise movement of the rod 68 toward the left and thus disengaging the gear 25 from the gear 24, as will be apparent. The disengagement of the gears 24 and 25 from each other will not, however, immediately terminate the rotation of the drive shaft, owing to the attachment to the latter of the fly-wheel 27. In order, therefore, to effect the requisite cessation of the rotation of the drive shaft, a separate brake mechanism D illustrated in Fig. 5, is made use of. This mechanism as shown in said figure comprises an angular treadle 74, whose vertical arm 75 is pivoted intermediate its ends to a transversely-disposed bar 76, said bar being provided toward its right hand end with a pair of depending collars 77 which embrace the shaft 26, and having its left hand end extending through the perforated upper member 78' of the double bracket 78 shown in Fig. 11, the portion of said bar which is connected with said shaft being bifurcated, the collars above referred to being formed upon the arms of the bifurcation. This bracket is formed in two parts or sections which are bolted together, as shown in said figure, the upper member 78' being included in the upper part or section. Each end of the treadle arm 75 is connected by a link 79 with a brake-shoe 80, the depression of the treadle effecting the movement of said shoes into engagement with the periphery of a friction disk 81 secured to the shaft 26 and located between the arms formed by the above mentioned bifurcation. The treadle, however, is normally held in raised position by a coil spring 82 connected with the bar 76 and with the treadle arm 75, as shown in Fig. 5.

Owing to the provision of the brake mechanism, it will be understood that the rotation of the drive shaft may be immediately terminated after the gear 25 has been disengaged from the gear 24 by the mechanism C.

The fifth-wheel 56 with which the drive shaft is provided has formed upon the forward portion of the lower member thereof a pair of depending ears between which is pivoted the upper end of a vertical rod 83 whose lower end is provided at opposite sides with sets of rack teeth 84. This rod forms a support for the earth-loosening mechanism E shown in Fig. 8, such mechanism including a pair of concavo-convex disks 85 which are set at an angle to each other and are carried by plates 86, each plate being in turn attached to the lower end of a rod 87, provided at its upper end with a toothed washer 88 arranged for engagement with the adjacent set of rack teeth 84, formed upon the rod 83, said sets of rack teeth being of sufficient length to permit the washers to be engaged with different portions thereof, and the disks 85 adjusted in consequence toward and from the ground. The washers 88 are retained in adjusted position in engagement with the rack teeth by means of a bolt 89 which passes through alining perforations in said washers and in the adjacent rod ends, and through the longitudinal slot 90 formed in the lower end of the rod 83, said slot opening at opposite sides through the rack teeth. The plates 86 which carry the disks 85 are each connected with a plate 91 disposed therebetween by means of a pair of horizontally-arranged threaded bolts 92, whose inner ends extend through threaded openings formed in the latter plate while their reduced outer ends 93 fit in openings in the plates 86, the diameter of the last-mentioned openings being somewhat greater than that of said bolt ends, as shown in Figs. 8, 12 to permit the requisite play of said bolt ends. The plates 86 are connected also with the rods 87 by means of flanged collars 94 whose inner portions fit in openings formed in the lower ends of said rods, said openings likewise having a greater diameter than that of said collars. The collars thus form what may be regarded as bearings for the disks and their plates 86, the loose fit of the collars in the rod openings permitting a slight rocking movement or angular adjustment of said disks and plates with reference to the rods and hence to the plate 91. This movement is effected by rotating the bolts 92 in the proper direction, each bolt being provided toward its end 93 with a pair of stationary nuts 93' arranged to contact with the adjacent plate 86, the bolts being separately adjusted, as will be apparent. Each of the plates 86 is provided with an integral forwardly-extending arm 95 whose free end is engaged in the bifurcated rear end of a brace 96, the forward end of which is connected to the adjacent brace 50, the braces 96 converging toward each other at their rear ends to permit their connection with the arms 95, as shown in Fig. 12.

The left hand sleeve 54 has a greater height than the right hand sleeve, as shown in Fig. 7, and the projecting upper portion of the post 97 fitted in its bore is made square to receive a similarly-shaped sleeve 98 formed upon the base portion of a seat 99, the shape of said seat being approximately the same as that of the seat of a bicycle. The rear face of said post has formed therein a longitudinal series of notches 100 which are engaged interchangeably by the in-bent lower end of a spring-pressed pawl 101 pivoted to an ear formed upon the rear wall of the sleeve 98, said pawl end projecting through a slot 102 formed in said rear wall, the provision of the pawl and the formation of the notches with which the in-bent pawl end engages, permitting the retention of the seat in adjusted position upon the post. The bottom of the seat is connected with the sleeve 98 by means of an inclined brace 103, the front end of said bottom portion terminating in an upstanding handle 104. The upper branch of the left hand brace 50 extends through the lower or collar member 105 of the double bracket 78 above referred to, said brace being provided rearwardly of said bracket with a transversely-disposed bar 106, which serves as a foot rest (see Figs. 1 to 7). As originally stated, this bracket is formed in two parts or sections, one half of the collar member 105 being formed by one part or section, and the other half by the other part or section. In positioning this bracket, the bar 76 is first engaged with the upper member 78', which is included in the upper part or section of the bracket, and said part or section then disposed upon the brace 50. The lower part or section is then disposed against the under surface of the brace directly beneath said upper part of section after which the two parts or sections are fastened together. It is possible, therefore, for the occupant of the seat to turn the latter and with it, the post 97 and sleeve 54, by swinging the seat in one direction or the other by means of the handle 104, and thus to steer the entire machine, the right hand post 97' and its ground wheel 55' following the movements of the left hand sleeve and its ground wheel, as will be understood, the pressure of the feet of the driver against one side or the other of the foot-rest serving to brace him during the steering.

In order to prevent the disengagement of the gear 25 from the gear 24 during the swinging movement of the shaft consequent upon the steering of the machine, the teeth of the last mentioned gear are curved, as shown in Fig. 1, so as to permit their engagement with the teeth of the gear 25, until the drive shaft is shifted by the lever 65 as above described.

During the travel of the machine across a field, it will be apparent that the rotation of the axle will effect the driving of the shaft 26 to which the fly-wheel 27 is secured, the hoes carried by the wheel thinning the rows of plants by chopping the latter at regular intervals, the number of hoes regulating the distances apart at which the plants are to stand, while the cutting disks 41 trim the plants, as will be understood. The disks 85 serve as scrapers for loosening the earth around the vines prior to the chopping and trimming operation.

It is to be noted that the scrapers are capable of adjustment separately from the chopping and trimming devices, and also that the last-mentioned devices are adjustable independently of each other, as above described.

What is claimed is:

1. In a cotton chopper, the combination, with a frame, and an axle provided with a driving gear, of an axially disposed shaft having a gear secured to its front end for engagement with the axle gear; a member secured to the rear end of said shaft and rotatable therewith; chopping elements carried by said member; a collar secured to said shaft adjacent its gear; a rod pivotally secured at one end to said collar; a chain connected at one end to the other end of said rod; and a lever pivoted to the frame and connected to the other end of said chain, for swinging said shaft bodily sidewise, to disengage its gear from the axle gear.

2. In a cotton chopper, the combination, with an axle provided with a driving gear, and a rearwardly-extending yoke connected to the axle and comprising upper and lower members arranged in spaced relation to each other, of an axially disposed shaft having its forward end extending through the space between said yoke members and provided with a gear arranged for engagement with the axle gear; a member secured to the rear end of the shaft and rotatable therewith; chopping implements secured to said member; a collar secured to said shaft adjacent its gear; a rod pivoted at one end to said collar; and a lever pivoted to one of said yoke members and connected with the other end of said rod, for swinging said shaft bodily sidewise, to disengage its gear from the axle gear.

3. In a cotton chopper, the combination, with an axle provided with a driving gear, and a rearwardly-extending yoke connected to the axle and comprising upper and lower members arranged in spaced relation to each other, of an axially-disposed shaft having its forward end extending through the space between said yoke members and provided with a gear arranged for engagement with the axle gear; a member secured to the rear end of the shaft and rotatable therewith; chopping implements secured to said member; a collar secured to said shaft adjacent its gear; means for normally holding said gears in engagement with each other; a rod pivoted at one end to said collar; and a lever pivoted to one of said yoke members and connected with the other end of said rod, for swinging said shaft bodily sidewise, to disengage its gear from the axle gear.

4. In a cotton chopper, the combination, with an axle provided with a driving gear, and a rearwardly-extending yoke connected to the axle and comprising upper and lower members arranged in spaced relation to each other, of an axially-disposed shaft having its forward end extending through the space between said yoke members and provided with a gear arranged for engagement with the axle gear; a member secured to the rear end of the shaft and rotatable therewith; chopping implements secured to said member; a collar secured to said shaft adjacent its gear; a rod pivoted at one end to said collar; a spring embracing said rod and connected with said collar for normally holding said gears in engagement with each other; and a lever pivoted to one of said yoke members and connected with the other end of said rod, for swinging said shaft bodily sidewise, to disengage its gear from the axle gear.

5. In a cotton chopper, the combination, with a shaft and means normally engaged with said shaft, for driving the same, of a member secured to said shaft and rotatable therewith; chopping implements carried by said member; means for moving said shaft bodily out of engagement with said driving means; and a brake mechanism connected with said shaft for operation subsequent to such disengagement.

6. In a cotton chopper, the combination, with a frame, and an axle provided with a driving gear, of an axially-disposed shaft having a gear secured to its front end for engagement with the axle gear; a member secured to the rear end of said shaft and rotatable therewith; chopping implements carried by said member; a lever pivoted adjacent its front end to the frame and connected at said end with said shaft, for swinging the latter bodily sidewise, to effect the disengagement of said gears from each other; and a brake mechanism connected with said shaft for operation subsequent to such disengagement.

7. In a cotton chopper, the combination, with a shaft and means normally engaged with said shaft, for driving the same, of a member secured to said shaft and rotatable therewith; chopping implements carried by said member; means for moving said shaft bodily out of engagement with said driving means; and a brake mechanism connected with said shaft for operation subsequent to such disengagement, said mechanism comprising a friction disk secured to said shaft, a treadle, and a pair of oppositely-disposed brake-shoes connected with the treadle and arranged for movement into engagement with said disk when the treadle is depressed.

8. In a cotton chopper, the combination, with a shaft and means normally engaged with said shaft, for driving the same, of a member secured to said shaft and rotatable therewith; chopping implements carried by said member; means for moving said shaft bodily out of engagement with said driving means; and a brake mechanism connected with said shaft for operation subsequent to such disengagement, said mechanism comprising a friction disk secured to said shaft, a transversely disposed rod secured to said shaft, an angular treadle pivoted at its lower end to said rod, and a pair of oppositely-disposed brake shoes connected with the treadle and arranged for movement into engagement with said disk when the treadle is depressed.

9. In a cotton chopper, the combination, with a frame, and an axle provided with a driving gear, of an axially-disposed shaft having a gear secured to its front end for engagement with the axle gear; a member secured to the rear end of said shaft and rotatable therewith; chopping implements carried by said member; a lever pivoted adjacent its front end to the frame and connected at said end with said shaft, for swinging the latter bodily sidewise, to effect the disengagement of said gears from each other; and a brake mechanism connected with said shaft for operation subsequent to such disengagement, said mechanism comprising a friction disk secured to said shaft, a treadle, and a pair of oppositely-disposed brake-shoes connected with the treadle and arranged for movement into engagement with said disk when the treadle is depressed.

10. In a cotton chopper, the combination, with a frame, and an axle provided with a driving gear, of an axially-disposed shaft having a gear secured to its front end for engagement with the axle gear; a member secured to the rear end of said shaft and rotatable therewith; chopping implements carried by said member; a lever pivoted adjacent its front end to the frame and connected at said end with said shaft, for swinging the latter bodily sidewise, to effect the disengagement of said gears from each other; and a brake mechanism connected with said shaft for operation subsequent to such disengagement, said mechanism comprising a friction disk secured to said shaft, a transversely disposed rod secured to said shaft, an angular treadle pivoted at its lower end to said rod, and a pair of oppositely-disposed brake-shoes connected with the treadle and arranged for movement into engagement with said disk when the treadle is depressed.

11. In a cotton chopper, the combination, with a shaft and means for rotating the same, of a member secured to the rear end of the shaft and rotatable therewith; chopping implements carried by said member; and means for raising or lowering the rear end of said shaft, to adjust the position of said implements with respect to the ground, said means including a plate connected with the shaft, a roller carried by said plate, a cam-shaped track upon which the roller is arranged to ride, devices for supporting said tracks and devices for rocking said track.

12. In a cotton chopper, the combination, with a shaft and means for rotating the same, of a member secured to the rear end of the shaft and rotatable therewith; chopping implements carried by said member; and means for raising or lowering the rear end of said shaft, to adjust the position of said implements with respect to the ground, said means including a fifth wheel secured to the shaft, a pair of rollers carried by the lower member of said wheel, a transverse shaft disposed directly beneath said rollers, means for supporting said transverse shaft, a pair of cam-shaped tracks secured to said transverse shaft and engaged by said rollers, and a lever secured at one end to said transverse shaft.

13. In a cotton chopper, the combination, with a shaft, and means for rotating the same, of a member secured to the rear end of the shaft; a plurality of rods carried by said member; a transversely-disposed eye-bolt adjustably carried by each rod; a cutting disk attached to the stem of each bolt; and means for tightening said bolts, to retain said disks in adjusted position upon said rods.

14. In a cotton chopper, the combination, with a shaft, and means for rotating the same, of a fly-wheel secured to the rear end of the shaft; a plurality of radially-disposed rods carried by said wheel; a hoe secured to the outer end of each rod; and a cutting disk disposed at right-angles to each hoe.

15. In a cotton chopper, the combination, with a shaft, and means for rotating the same, of a fly-wheel secured to the rear end of the shaft; a plurality of radially-disposed rods carried by said wheel; a hoe secured to the outer end of each rod; and a cutting disk carried by each rod and arranged at right angles to the hoe thereon, said disks being adjustable toward and from said rods.

16. In a cotton chopper, the combination, with a shaft, and means for rotating the same, of a fly-wheel secured to the rear end of the shaft and provided with a plurality of inwardly extending peripheral recesses; a rod having its inner end adjustably fitted in each recess; a hoe secured to the outer end of each rod; a transversely-disposed eye-bolt adjustably carried by each rod; a cutting disk attached to the stem of each bolt; and means for tightening said bolts, to retain said disks in adjusted position upon said rods.

17. In a cotton chopper, the combination, with a shaft, and means engaged with the front end of the shaft for driving the same, of a fly-wheel secured to the rear end of the shaft; a plurality of radially-disposed rods carried by said wheel; a hoe and a cutting disk carried by each rod; means for swinging the front end of said shaft bodily to one side, to effect its disengagement from said driving means; and a brake mechanism connected with said shaft for operation subsequent to such disengagement.

18. In a cotton chopper, the combination, with a shaft, and means engaged with the front end of the shaft for driving the same, of a fly-wheel secured to the rear end of the shaft; chopping implements carried by said wheel; means for swinging the front end of said shaft bodily to one side, to effect its disengagement from said driving means; and a brake mechanism connected with said shaft for operation subsequent to such disengagement.

19. In a cotton chopper, the combination, with a shaft, and means engaged with the front end of the shaft for driving the same, of a fly-wheel secured to the rear end of the shaft; chopping implements carried by said wheel; means for raising and lowering the rear end of said shaft, to adjust the position of said implements with respect to the ground; means for swinging the front end of said shaft bodily to one side, to effect its disengagement from said driving means; and a brake mechanism connected with said shaft for operation subsequent to such disengagement.

20. In a cotton chopping machine, the combination, with a frame, comprising a relatively stationary front section and a swinging rear section connected therewith, of an axially-disposed shaft carried by said frame; a member secured to the rear end of the shaft; a plurality of chopping implements carried by said member, means for driving said shaft; a pair of connected vertical sleeves carried by the rear frame section; a post fitted in each sleeve; a ground wheel carried by each post; and means for turning one of said posts, to steer the machine.

21. In a cotton chopping machine, the combination, with a frame comprising a relatively stationary front section and a swinging rear section connected therewith, of an axially-disposed shaft carried by said frame; a member secured to the rear end of the shaft; a plurality of chopping implements carried by said member; means for driving said shaft; a pair of connected vertical sleeves carried by the rear frame section; a post fitted in each sleeve; a ground wheel carried by each post; a seat fitted upon the upper end of one of said posts and engaged therewith; and means for turning said seat, to steer the machine.

22. In a cotton chopping machine, the combination, with a frame comprising a relatively stationary front section and a swinging rear section connected therewith, of an axially-disposed shaft carried by said frame; a member secured to the rear end of the shaft; a plurality of chopping implements carried by said member; means for driving said shaft; a pair of connected vertical sleeves carried by the rear frame section; a post fitted in each sleeve, one of said posts being provided at its upper end with a vertical series of notches; a seat provided with a depending sleeve fitted upon the notched end of said post; means carried by the last-mentioned sleeve for engagement with said notches; a ground wheel carried by each post; and means for turning said seat.

23. In a cotton chopping machine, the combination with an axle, of a frame comprising a front section carried by the axle, and a swinging rear section connected with said front section; an axially-disposed shaft carried by said frame sections; means carried by the axle and engaged with the shaft, for driving the latter; a member secured to the rear end of the axle, a plurality of cutting implements carried by said member; means for raising the rear end of the shaft to adjust the position of said implements with respect to the ground; means for swinging the front end of said shaft bodily to one side, to effect its disengagement from said driving means; and means carried by the rear section of the frame, for steering the machine.

24. In a cotton chopping machine, the combination with an axle, of a frame comprising a front section carried by the axle and a swinging rear section connected with said front section; an axially-disposed shaft carried by said frame sections; means carried by the axle and engaged with the shaft, for driving the latter; a member secured to the rear end of the axle; a plurality of cutting implements carried by said member; means for raising the rear end of the shaft to adjust the position of said implements with respect to the ground; means for swinging the front end of said shaft bodily to one side, to effect its disengagement from said driving means; a brake mechanism connected with said shaft for operation subsequent to such disengagement; and means carried by the rear section of the frame, for steering the machine.

25. In a cotton chopper, in combination, an axle; a front frame section pivoted thereto and provided with horizontal and vertical slots extending transversely of the section and communicating with each other; a rear frame section including a rod having its forward end extending through the horizontal slot and provided with upper and lower rollers arranged to travel in the vertical slot; an axially disposed shaft carried by said frame sections; means for rotating the shaft; and a member secured to the rear end of the shaft and provided with a plurality of cutting implements.

26. In a cotton chopper, in combination, an axle; a front frame section pivoted thereto and provided with horizontal and vertical slots extending transversely of the section and communicating with each other; a rear frame section including a rod having its forward end extending through the horizontal slot and provided with means for projecting into the vertical slot; an axially-disposed shaft carried by said frame sections; means for rotating the shaft; and a member secured to the rear end of the shaft and provided with a plurality of cutting implements.

27. In a cotton chopping machine, in combination, an axle; upper and lower rearwardly-extending horizontal yokes pivoted thereto, the upper yoke consisting in part of spaced upper and lower members, the lower yoke forming the front section of the machine frame and being provided with communicating horizontal and vertical slots extending transversely of the section; a rear frame section including a rod having its forward end extending through the horizontal slot, and provided with upper and lower rollers arranged to travel in the vertical slot; an axially-disposed shaft having its front end extending through the space between the members of the upper yoke; means for rotating the shaft; and a member secured to the rear end of the shaft and provided with a plurality of cutting implements.

In testimony whereof, I affix my signature, in presence of two witnesses.

EUGENE C. GESCHE.

Witnesses:
B. E. COOKSEY,
H C. McCARTENEY.